Figure 1:
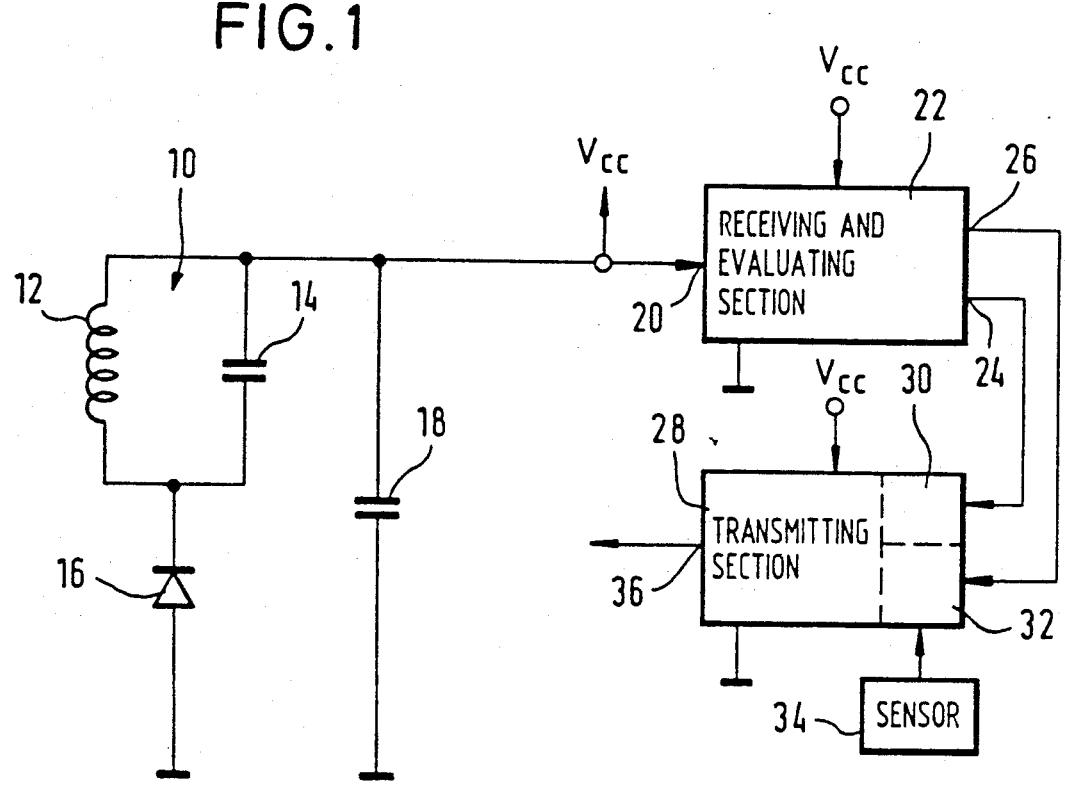

United States Patent [19]

Stickelbrocks

[11] Patent Number: 5,073,781
[45] Date of Patent: Dec. 17, 1991

[54] TRANSPONDER

[75] Inventor: Karl Stickelbrocks, Freising, Fed. Rep. of Germany

[73] Assignee: Texas Instruments Deutschland GmbH, Freising, Fed. Rep. of Germany

[21] Appl. No.: 648,099

[22] Filed: Jan. 31, 1991

[30] Foreign Application Priority Data

Jan. 31, 1990 [DE] Fed. Rep. of Germany ....... 4002801

[51] Int. Cl.$^5$ ............................................. G01S 13/80
[52] U.S. Cl. ........................................ 342/51; 455/73
[58] Field of Search ............................ 342/51; 455/73

[56] References Cited

U.S. PATENT DOCUMENTS 3,713,148 1/1973 Cardullo et al. ................... 342/51 X
4,412,219 10/1983 Briggs .................................. 342/51

Primary Examiner—Mark Hellner
Attorney, Agent, or Firm—James C. Kesterson; James T. Comfort; Melvin Sharp

[57] ABSTRACT

A transponder includes a receiving and evaluating section (22) andd a transmitting section (28). It further includes an energy storage means (18) which is chargeable by an HF interrogation pulse furnished by an interrogation device and supplies the supply voltage for the receiving and evaluating section (22) and for the transmitting section (28). An identification generator (30) in the transponder furnishes identification data fixedly associated therewith and a measurement data generator (32) receives from a sensor (34) measurement signals and converts said measurement signals to measurement data. The receiving and evaluating section (22) clears the transmitting section (28) for transmitting the identification data only when the supply voltage exceeds a first predetermined threshold value. The transmitting section is cleared for transmission of the measurement data only when the supply voltage at the energy storage means (18) is greater than a second predetermined threshold value which lies above the first predetermined threshold value.

4 Claims, 3 Drawing Sheets

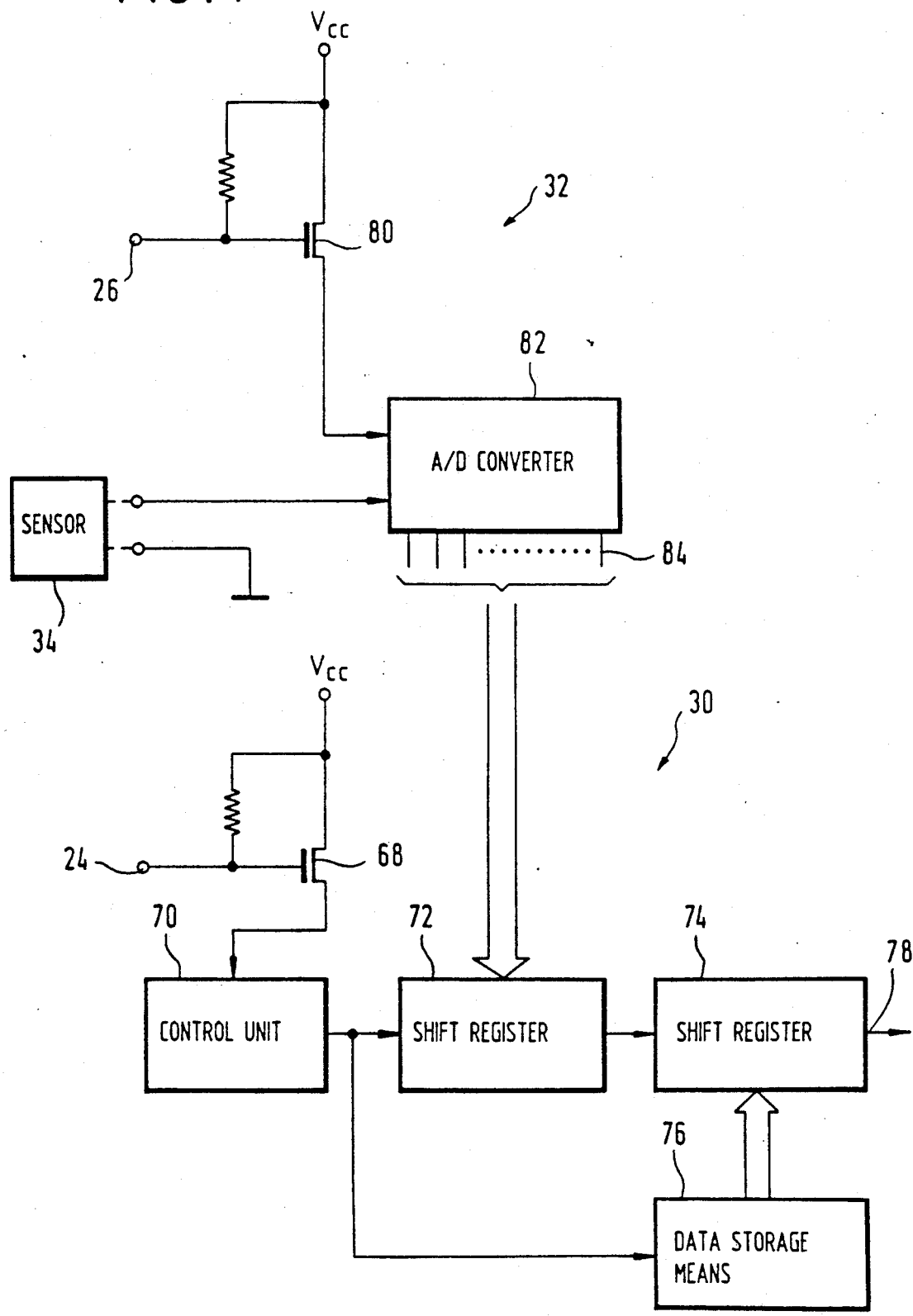

TRANSPONDER

The invention relates to a transponder comprising a receiving and evaluating section and a transmitting section, an energy storage means which is chargeable by an HF interrogation pulse furnished by an interrogation device and furnishes the supply voltage for the receiving and evaluating section and the transmitting section, an identification generator which furnishes identification data fixedly associated therewith and a measurement data generator which receives signals from a sensor and converts them to measurement data, the receiving and evaluating section being constructed in such a manner that it clears the transmitting section for transmitting the identification data only when the supply voltage exceeds a first predetermined threshold value.

EP-A-0 301 127 describes a transponder which can be used in conjunction with an interrogation device in an identification system. In such an identification system individual objects are each provided with a transponder in which an identification associated with said object is stored. When an HF interrogation pulse is transmitted by means of an interrogation device and an object carrying a transponder is located within the transmission range of the interrogation device the transponder answers by transmitting the code stored therein which is received by the interrogation device and registered. For example, the transponders can be attached to animals which are located in a stable or the like and which are to be continuously monitored with the aid of fixedly installed or portable interrogation devices.

There is a need not only to transmit the identification data to the interrogation device as reaction to the HF interrogation pulse but in addition also to send back measurement data which represent one or more physical parameters at the location of the transponder which have been detected with the aid of one or more sensors. The conversion of the physical parameters detected by the sensors to a form suitable for transmission requires additional energy, as does the actual sending back of the measurement data, and this energy must be supplied by the energy storage means in the transponder. Due to the different spatial distances between the interrogation device and a transponder the energy storage device in the transponder is not always completely charged up by an HF interrogation pulse and consequently it will happen relatively frequently that the energy available is not sufficient to transmit back to the interrogation device completely and with the necessary range both the identification data and the measurement data generated by conversion from the measurement signals furnished by the sensors. There is a danger that the identification data will be mutilated so that the information received by the interrogation device can no longer be evaluated.

The invention is based on the problem of providing a transponder of the type mentioned at the beginning in which it is ensured that at least the identification data can be transmitted to the interrogation device unmutilated if the energy necessary therefor is present in the energy storage means.

This problem is solved according to the invention in that the receiving and evaluating section does not clear the transmitting section for the transmission of the measurement data until the supply voltage at the energy storage means is greater than a second predetermined threshold value which lies above the first predetermined threshold value.

In the transponder according to the invention the receiving and evaluating section checks before each enabling or clearance of the sending section whether the supply voltage at the energy storage means is adequate to send back to the interrogation device the identification data and the measurement data. If the supply voltage is too low for this complete information transmission only the identification data are sent back whilst the transmitting back of the measurement data is not enabled. In this manner mutilation of the important identification data is avoided so that in spite of incomplete charging of the energy storage means identification of the object provided with the transponder is ensured.

Advantageous further developments of the invention are characterized in the subsidiary claims.

Figure 2:
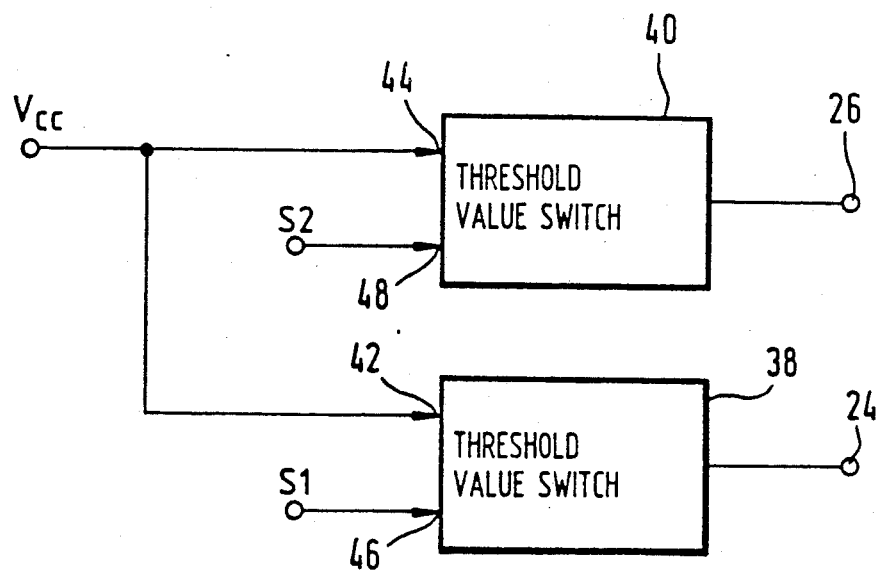
Figure 3:
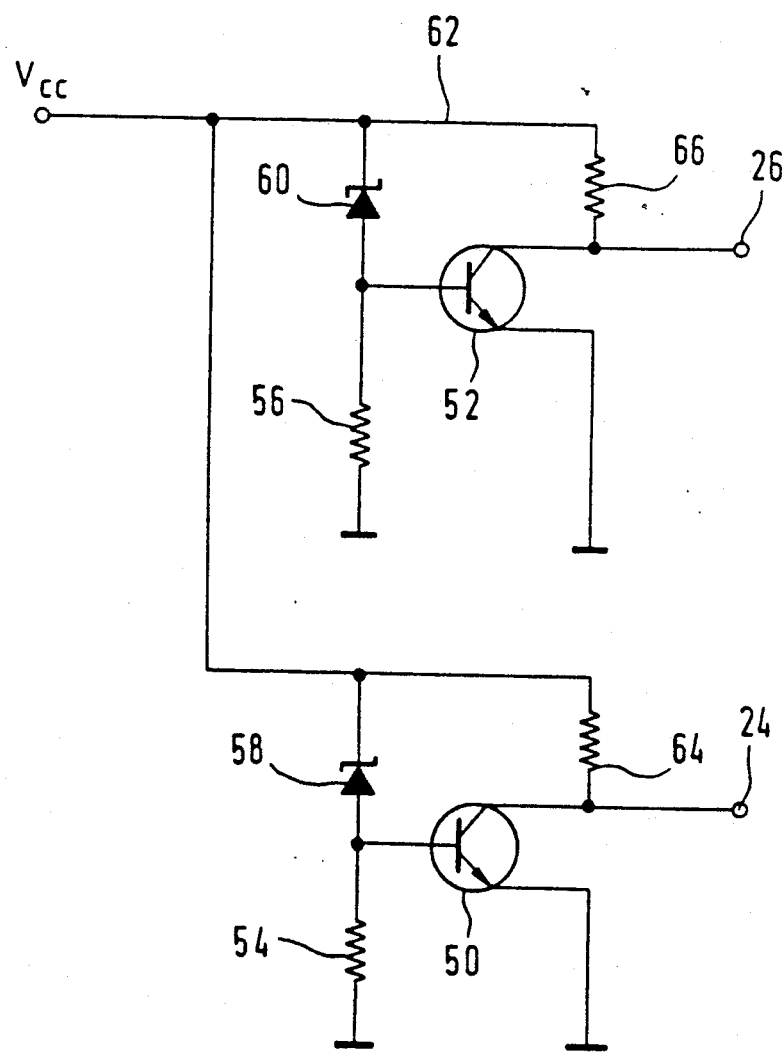

The invention will now be explained by way of example with the aid of the drawings, wherein:

FIG. 1 is a schematic circuit diagram of the transponder according to the invention, partly as block circuit diagram, FIG. 2 shows a circuit portion of the receiving and evaluating section which effects the checking of the supply voltage at the energy storage means, FIG. 3 shows an example of embodiment of the threshold value switches used in FIG. 2 and FIG. 4 shows a portion of the transmitting section for explaining the transmission of the identification and/or measurement data back to the interrogation device.

The schematic circuit diagram of FIG. 1 shows only those components of the transponder to be described which are necessary for the understanding of the invention. The transponder includes a resonance circuit 10 having a coil 12 and a capacitor 14 connected in parallel therewith; the resonance frequency of said resonance circuit 10 corresponds to the frequency of an HF interrogation pulse transmitted by an interrogation device which is not illustrated. Lying in series with the resonance circuit 10 is a diode 16. As soon as the resonance circuit 10 receives an HF interrogation pulse the diode performs a rectification so that a capacitor 18 lying in parallel with the resonance circuit 10 and the diode 16 and acting as energy storage means is charged up. The supply voltage $V_{cc}$ for the other components of the transponder can then be tapped from said capacitor. The supply voltage is applied to a signal input 20 of a receiving and evaluating section 22 which furnishes enable or clearance signals at the outputs 24 and 26 depending on the magnitude of the supply voltage. Said enable signals are supplied to a transmitting section 28 which contains an identification generator 30 and a measurement data generator 32. In the identification generator 30 identification data fixedly associated with the transponder are stored and the measurement signal generator 32 can generate measurement data which it obtains from the conversion of measurement signals supplied to it by a sensor 34. The sensor may for example be a temperature sensor. As soon as the identification generator 30 receives an enable signal from the receiving and evaluating section 22 the transmitting section 28 can take on the identification data and emit said data at an output 36. The signals furnished by the output 36 are employed to modulate an HF oscillation stimulated by means which are not illustrated in the resonance circuit 10 and this oscillation can then be radiated by the coil 12 of the resonance circuit 10 and received by the interrogation device. The interrogation device thus receives via the identification data information on the identity of the object to which the transponder is attached.

The enable signal at the output 26 of the receiving and evaluating section 22 results in the measurement signals furnished by the sensor 34 being converted in the measurement data generator 32 to a form in which they can likewise be emitted by the transmitting section at the output 36 thereof and employed to modulate the oscillation in the resonance circuit 10. In this manner the interrogation device can also receive information on the physical parameter detected by the sensor 34.

FIG. 2 shows schematically how in the receiving and evaluating section 22 the enable signals are generated at the outputs 24 and 26. The circuit section responsible for this contains two threshold value switches 38 and 40 each having an input 42 and 44 respectively to which the supply voltage $V_{cc}$ is applied. Furthermore, each threshold value switch comprises an input 46 and 48 to which a reference voltage defining a threshold value S1 and S2 respectively is applied.

The threshold value S1 is lower than the threshold value S2 which means that the threshold value switch furnishes the enable signal at the output 24 as soon as the supply voltage $V_{cc}$ is greater than the threshold value S1 whilst it does not furnish the enable signal at the threshold value switch 26 until the supply voltag $V_{cc}$ is also greater than the threshold value S2. The threshold value S1 is set so that the enable signal is not emitted at the output 24 until the energy stored in the capacitor 18 serving as energy storage means is with certainty adequate for making available to the transmitting section 28 the energy necessary for transmitting back the complete identification data. The threshold value S2 is set so that the enable signal is not furnished at the output 26 until the energy stored in the capacitor 18 suffices to transmit back the identification data and the measurement data.

FIG. 3 illustrates an example of how the threshold value switches 38 and 40 may be made up. Each of said threshold value switches 38, 40 includes a transistor 50, 52, the base of which is connected to the connection point of a series circuit comprising a resistor 54 and 56 respectively and a zener diode 58 and 60 respectively. The two series circuits lie between the supply voltage line 62 and ground. A further resistor 64 and 66 respectively lies between the supply voltage line 62 and the respective emitter of the transistors 50, 52. The emitters of the two transistors 50, 52 are applied to ground. In the two threshold value switches the respective zener voltage of the zener diodes 58, 60 defines the threshold values. As soon as the respective threshold value is exceeded the corresponding enable signal is emitted at the output 24 or 26.

FIG. 4 illustrates a circuit diagram which shows one possibility of the manner in which the identification data and the measurement data can be processed for transmission under the control of the enable signals at the outputs 24, 26, in the transmitting section 28.

As soon as the threshold value switch 38 furnishes the enable signal at the output 24 a field-effect transistor 68 contained in the identification generator 30 is put in the conductive state so that a control unit 70 is rendered active. The control unit 70 is essentially a clock generator which applies shift pulses to two series-connected shift registers 72 and 74. It also applies a transmission signal to an identification data storage means 76. The application of said transmission signal to the identification data storage means 76 causes the contents of the identification data storage means to be transferred to the shift register 64. By clocking the two shift registers 72 and 74 with the aid of the clock signals from the control unit 70 the identification data transferred from the identification data storage means 76 to the shift register 74 can be emitted serially at the output 78 so that in the transmitting section 28 they can be brought into the form necessary for modulating the oscillation of the resonance circuit 10. It has hitherto been assumed that the receiving and evaluating section 22 has furnished an enable signal only at the output 24. This means that the shift register 72 has not received any input signals apart from the clock pulses from the control unit 70. The shift register 78 therefore also furnishes at the output only the identification data from the identification data storage means 76.

However, as soon as the receiving and evaluating section 22 also furnishes at its output 26 an enable signal, i.e. the supply voltage $V_{cc}$ available suffices to transmit back both the identification data and the measurement data, the enable signal at the output 26 renders a field-effect transistor 80 conductive and as a result an A/D converter 82 is activated. In the activated state said A/D converter 82 converts the analog signals supplied to it by the sensor 34 to digital signals which are emitted parallel at the outputs 84 and transferred to the shift register 72. As a result, after emission of the identification data at the output 78 the measurement data meanwhile shifted into the shift register 74 are also emitted so that in the desired manner both the identification data and the measurement data are used by the transmitting section 28 to modulate the oscillation of the resonance circuit 10.

Thus, as soon as an adequately large supply voltage $V_{cc}$ is available at the capacitor 18 the circuit illustrated as example in FIG. 4 causes the transponder to send back to the interrogation device not only the important identification data but also the measurement data which correspond to a physical parameter detected by the sensor 34. The use of the threshold value switches 38 and 40 ensures that in unfavourable transmission cases in which the energy storage means in the transponder has not been completely charged the transmitting back of the measurement data is supressed because then in all probability the energy available will suffice to send back the identification data.

More detailed description of a suitable implementation of the transponder and interrogation units are provided in U.S. application Ser. No. 216,756 filed July 8, 1988, assigned to the assignee of the present application and incorporated herein by reference.

I claim:

1. Transponder comprising a receiving and evaluating section and a transmitting section, an energy storage means which is chargeable by an HF interrogation pulse furnished by an interrogation device and furnishes the supply voltage for the receiving and evaluating section and the transmitting section, an identification generator which furnishes identification data fixedly associated therewith and a measurement data generator which receives signals from a sensor and converts them to measurement data, including enabling means connected to provide enabling inputs to the transmitting section for transmitting the identification data only when the supply voltage exceeds a first threshold value and for transmitting the measurement data only when the supply voltage is greater than a second threshold value different than the first threshold value.

2. A transponder according to claim 1, wherein the receiving and evaluating section includes two threshold value switches of which the switching thresholds correspond to the first threshold value and to the second threshold value respectively.

3. A transponder according to claim 1, including first and second series-connected shift registers, the first shift register connected to receive the measurement data in parallel when the transmitting section is enabled for transmitting the measurement data, and the second shift register connected to receive the identification data when the transmitting section is enabled for transmitting the identification data.

4. A transponder according to claim 1, wherein the receiving and evaluating section includes two threshold-value switches having threshold corresponding respectively to the first and second threshold values; and the transmitting section includes first and second series-connected shift registers, the first shift register connected to receive the measurement data in parallel when the transmitting section is enabled for transmitting the measurement data, and the second shift register connected to receive the identification data when the transmitting section is enabled for transmitting the identification data.

* * * * *